(12) United States Patent
Li et al.

(10) Patent No.: US 8,098,494 B2
(45) Date of Patent: Jan. 17, 2012

(54) ELECTRONIC DEVICE

(75) Inventors: Hsiao-Feng Li, Taipei (TW); Po-Jen Ke, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 358 days.

(21) Appl. No.: 12/506,253

(22) Filed: Jul. 21, 2009

(65) Prior Publication Data
US 2010/0067204 A1 Mar. 18, 2010

(30) Foreign Application Priority Data

Sep. 12, 2008 (TW) ................................ 97135235 A

(51) Int. Cl.
*H05K 7/02* (2006.01)
(52) U.S. Cl. ...... 361/752; 361/837; 200/296; 455/575.1
(58) Field of Classification Search .................. 361/752, 361/837; 200/296, 341–345, 330, 332, 339; 341/22; 455/550.1, 575.1, 575.3, 575.4
See application file for complete search history.

(56) References Cited

U.S. PATENT DOCUMENTS

| | | | | |
|---|---|---|---|---|
| 5,749,457 A | * | 5/1998 | Castaneda et al. | 200/343 |
| 6,148,183 A | * | 11/2000 | Higdon et al. | 455/575.1 |
| 6,876,837 B2 | * | 4/2005 | Kuroshima et al. | 455/90.3 |
| 7,369,881 B2 | * | 5/2008 | Tsujimoto | 455/575.1 |
| 7,383,066 B2 | * | 6/2008 | Park | 455/575.1 |
| 7,554,050 B1 | * | 6/2009 | Lv | 200/339 |
| 7,576,291 B2 | * | 8/2009 | Tseng et al. | 200/296 |
| 7,800,008 B2 | * | 9/2010 | Shi et al. | 200/547 |
| 7,933,123 B2 | * | 4/2011 | Wang et al. | 361/679.56 |
| 2007/0171208 A1 | | 7/2007 | Sung et al. | |
| 2008/0088489 A1 | * | 4/2008 | Moon | 341/22 |

FOREIGN PATENT DOCUMENTS

CN 1476214 2/2004

OTHER PUBLICATIONS

"First Office Action of China Counterpart Application", issued on Jul. 19, 2011, pp. 1-3.

* cited by examiner

*Primary Examiner* — Dameon Levi
(74) *Attorney, Agent, or Firm* — Jianq Chyun IP Office

(57) ABSTRACT

An electronic device includes a housing, a circuit board, a switch, and a side key. The housing has a plurality of side walls. The circuit board is disposed in the housing. The switch is disposed at an inner surface of the housing relatively close to the circuit board. The side key disposes through one of the side walls, and the location of the side key is corresponding to the switch. When the side key is pressed, the side key contacts the switch to make the switch electrically connected with the circuit board.

11 Claims, 6 Drawing Sheets

ELECTRONIC DEVICE

CROSS-REFERENCE TO RELATED APPLICATION

This application claims the priority benefit of Taiwan application serial no. 97135235, filed on Sep. 12, 2008. The entirety of the above-mentioned patent application is hereby incorporated by reference herein and made a part of specification.

BACKGROUND OF THE INVENTION

1. Field of the Invention

The invention relates to an electronic device and, more particularly, to an electronic device easily assembled.

2. Description of the Related Art

Function keys, such as volume keys, camera keys, and recording keys, are usually disposed on sides of conventional electronic devices. The conventional electronic devices may be mobile phones, personal digital assistants and so on. The function keys disposed on the side of the electronic device are commonly called side keys. A user may press the side key to adjust volume when he or she answers the phone by the electronic device. Side keys can also be used as other types of shortcut function keys. For example, the user may press the side key to perform a function quickly, such as a recording function or a photographing function.

FIG. 1A and FIG. 1B are schematic diagrams showing parts of a conventional electronic device from different visual angles. A circuit board 110 and a switch 120 of a conventional electronic device 100 such as a mobile phone are located in a housing 130. The switch 120 is located on the circuit board 110.

In the conventional electronic device 100, to make the switch 120 located on the circuit board 110 firmly, the switch 120 is inserted into the circuit board 110 by utilizing surface mount technology (SMT). Detailedly speaking, the circuit board 110 has positioning holes 112. The switch 120 has positioning pillars (not shown). The switch 120 is disposed on the circuit board 110 firmly by making the positioning pillars of the switch 120 pass through the positioning holes 112 of the circuit board 110. The side key 140 is located on one side of the housing 130. The user may press the side key 140 to conveniently change the volume of the phone when he or she answers the phone and the volume of the music when the music is played. Furthermore, the user also may press the side key 140 to conveniently execute photographing and recording programs.

However, since the switch 120 is inserted into the circuit board 110 by utilizing the SMT, the positioning holes 112 on the circuit board 110 corresponding to the switch 120 are through holes on the circuit board 110. Additionally, considering both of positioning and firm fastening issues of the switch 120, the switch 120 usually has two positioning pillars, and the circuit board 110 has two corresponding positioning holes 112. However, after the positioning holes 112 are made on the circuit board 110, since the positioning holes 112 are used for assembling the positioning pillars of the switch 120 to the circuit board 110 in contraposition, and the volume of the switch 120 occupies the layout region of the circuit board 110, the positions close to the positioning holes 112 on the circuit board 110 cannot be designed to dispose other electronic components on. As stated before, since the switch 120 is disposed on the circuit board 110, the space on the circuit board 110 for disposing the electronic components is occupied, and thus the available layout region for disposing electronic components is relatively less.

Additionally, since the switch 120 is inserted into the circuit board 110 by utilizing the SMT, the assembly process has more steps and the assembly time is longer. Furthermore, in the assembly and reflow soldering processes, the switch 120 easily deviates when the circuit board 110 is moved or transported, and thus the product yield rate is affected.

BRIEF SUMMARY OF THE INVENTION

The invention provides an electronic device easily assembled and the product yield rate of the electronic device is high.

The invention provides an electronic device which includes a housing, a circuit board, a switch, and a side key. The housing includes a plurality of side walls. The circuit board is disposed in the housing. The switch is disposed on an inner surface of the housing which faces toward the circuit board. The side key disposes through one of the side walls and is located correspondingly to the switch. When the side key is pressed, the switch contacts the switch and generates an electrical signal, and the electrical signal is transmitted to the circuit board via the switch.

In an embodiment of the invention, the housing includes a first body and a second body. The first body and the second body are assembled together. The switch is disposed at the inner surface of the first body which faces towards the circuit board.

In an embodiment of the invention, the first body further includes a plurality of limiting structures protruding from the inner surface. The switch is fastened with the limiting structure.

In an embodiment of the invention, the limiting structures are a plurality of ribs.

In an embodiment of the invention, the electronic device further includes an electromagnetic shielding cover. The circuit board has a layout region, and at least a part of the layout region is covered by the electromagnetic shielding cover.

In an embodiment of the invention, the switch is disposed on the position of the housing corresponding to the layout region uncovered by the electromagnetic shielding cover.

In an embodiment of the invention, the electronic device further includes a FPC disposed on the electromagnetic shielding cover and below the switch correspondingly. The FPC is electrically connected with the circuit board.

In an embodiment of the invention, the switch includes a body, a first contact element, and a plurality of connecting elastic elements. The body is disposed at the inner surface of the housing. The first contact element is disposed in the body. A part of the first contact element is exposed from the body. The first contact element is electrically connected with the connecting elastic elements via the circuit board.

In an embodiment of the invention, the side key includes a key body and a second contact element. A part of the key body is exposed from the housing. The second contact element is located in the housing and connected with the key body. The second contact element is disposed correspondingly to the first contact element.

In an embodiment of the invention, the first contact element includes a first protrusion portion. The second contact element includes a second protrusion portion. When the key body is pressed, the key body pushes the second contact element to make the second protrusion portion contact the first protrusion portion of the first contact element.

In an embodiment of the invention, at least one of the first protrusion portion and the second protrusion portion is a protrusion. The other is a protrusion, a pillar or a block.

According to the invention, the switch is disposed on the housing in an easy way, and thus the assembly process can be simplified and the assembly hours are saved. Additionally, since the switch is disposed on the housing, the layout region of circuit board for disposing electronic components is increased.

These and other features, aspects and advantages of the present invention will become better understood with regard to the following description, appended claims, and accompanying drawings.

DETAILED DESCRIPTION OF THE EMBODIMENTS

Figure 1A:
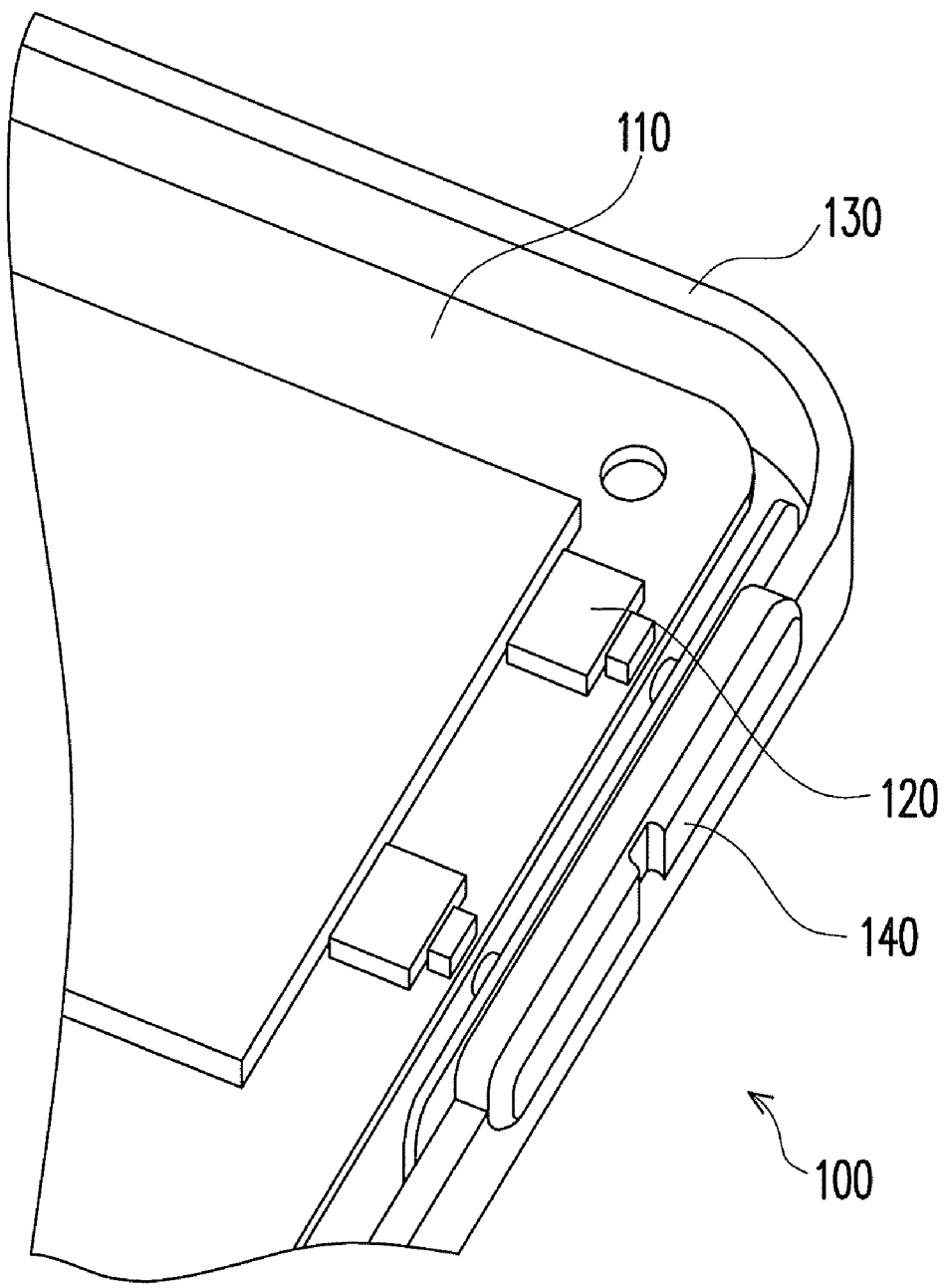
FIG. 1A and FIG. 1B are schematic diagrams showing parts of a conventional electronic device from different visual angles.
Figure 1B:
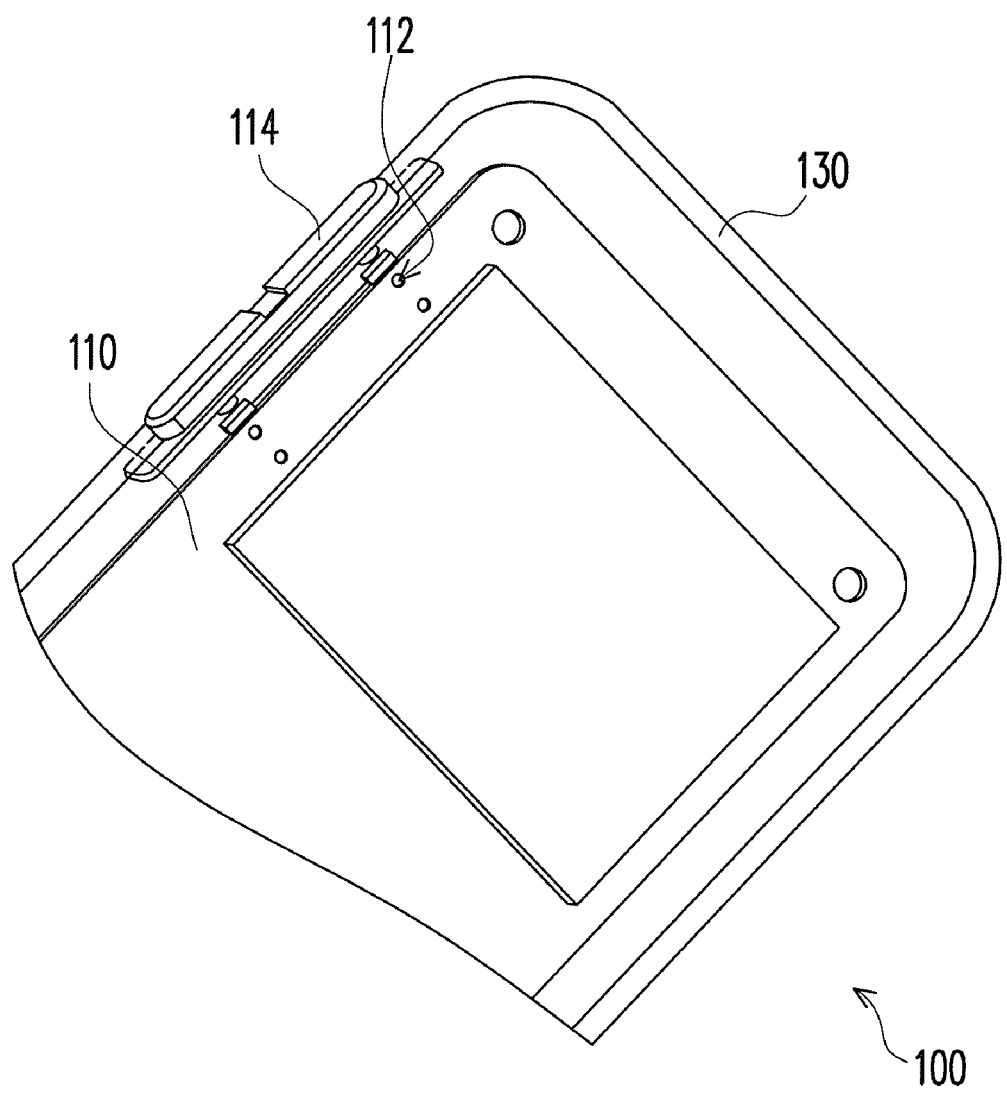
Figure 2A:
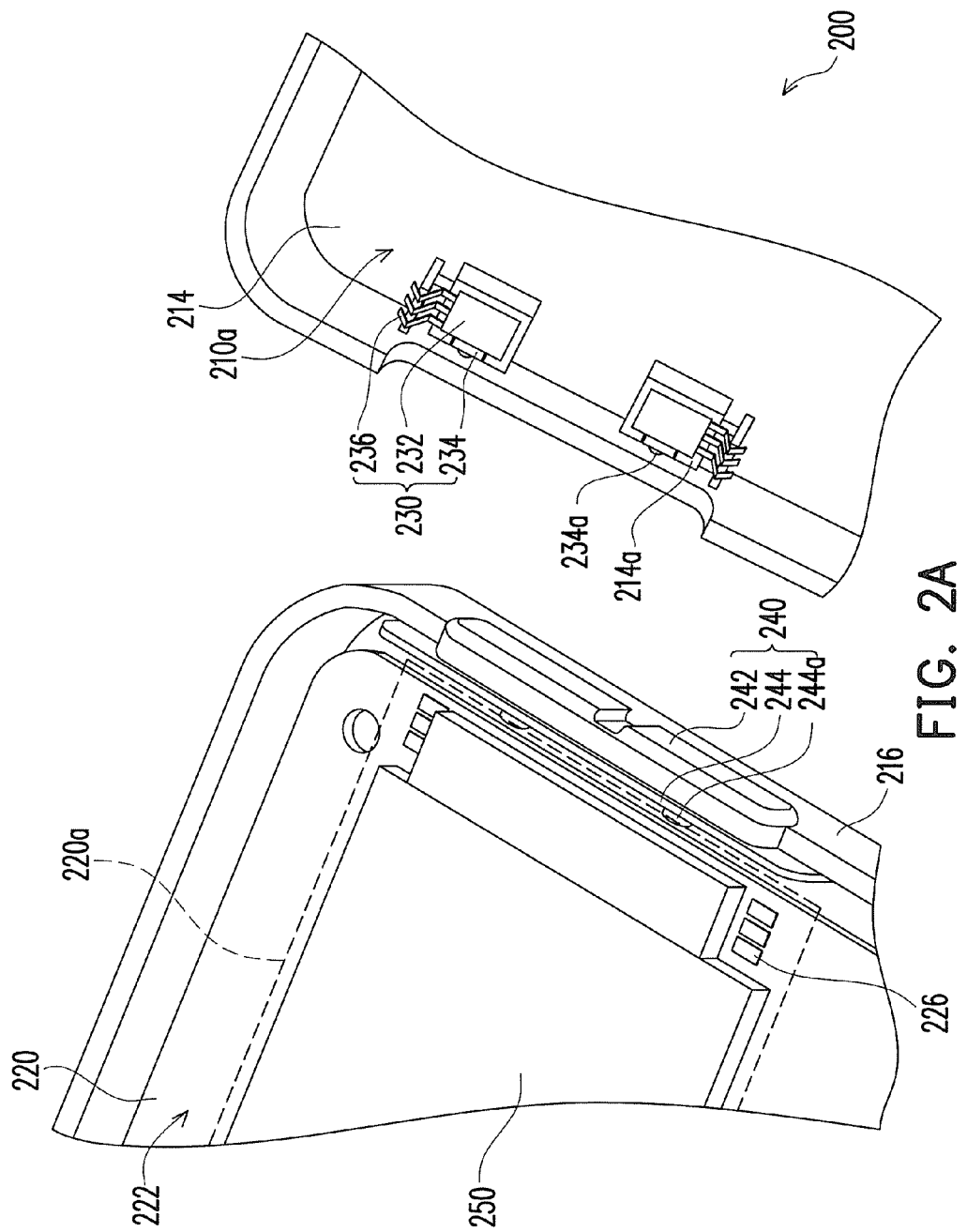
FIG. 2A is a schematic diagram showing an electronic device according to a first embodiment of the invention.
Figure 2B:
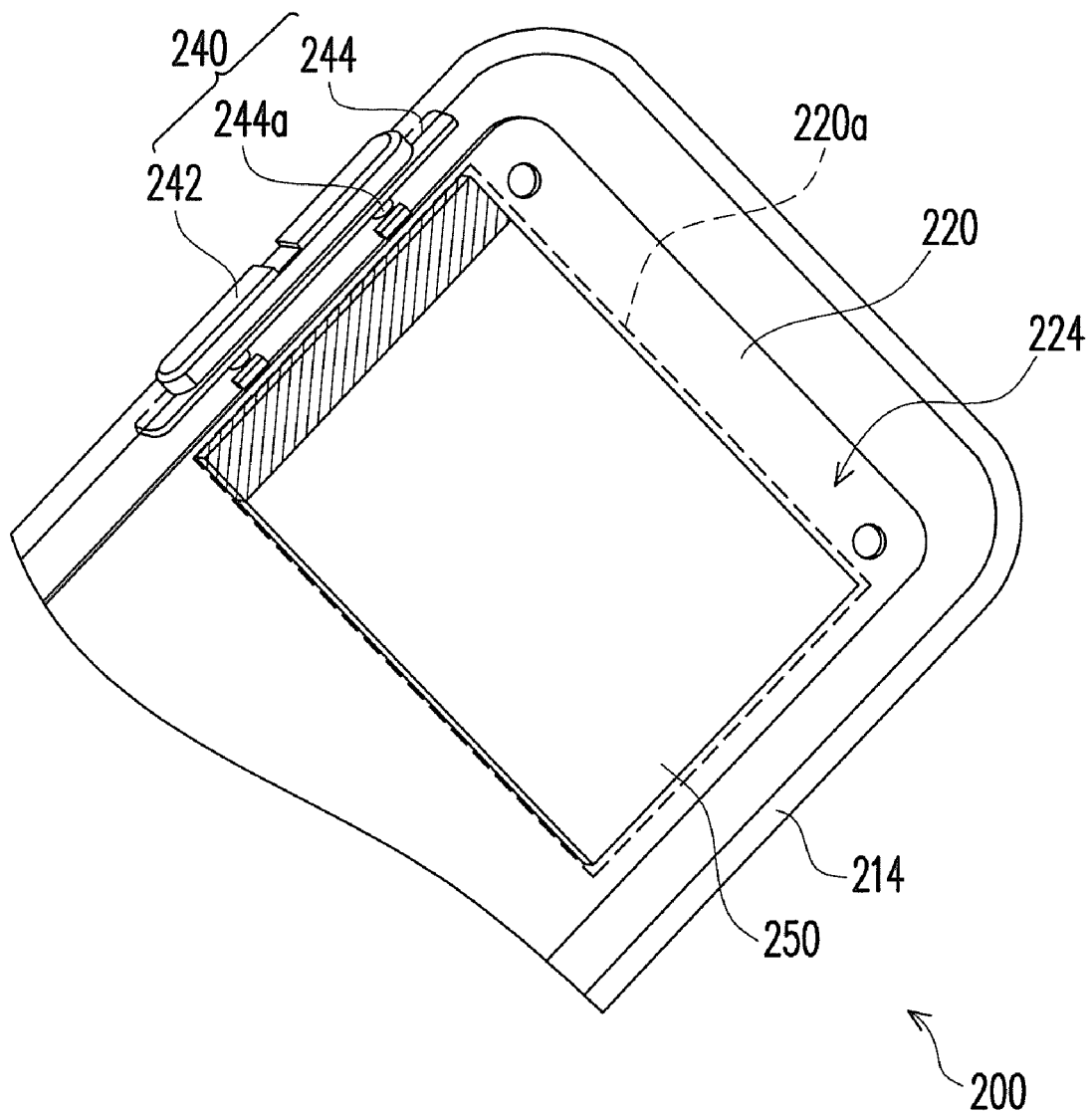
FIG. 2B is a schematic diagram showing the electronic device in FIG. 2A from another visual angle.
Figure 2C:
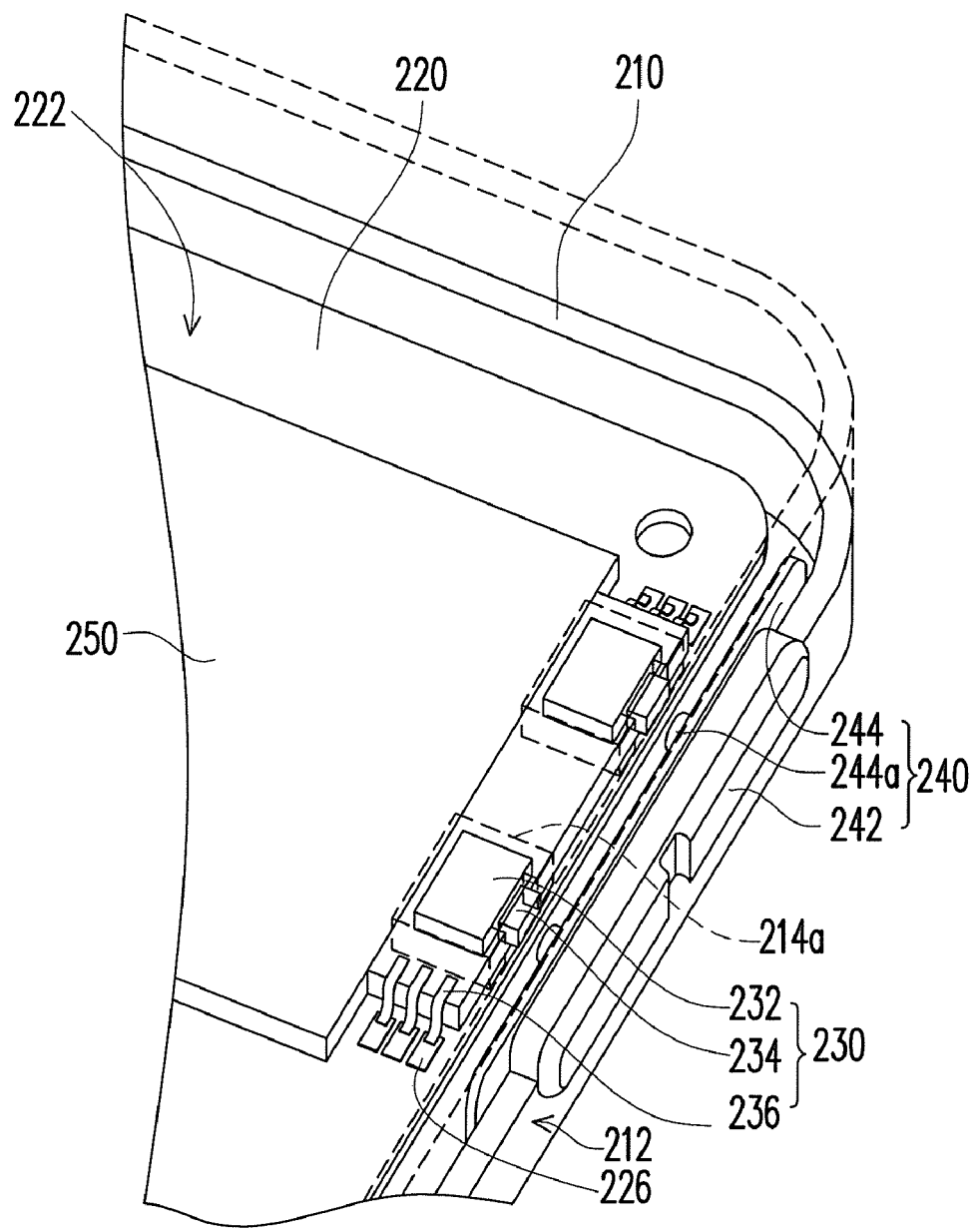
FIG. 2C is a schematic diagram showing that a switch is located on an inner surface of the electronic device.

FIG. 2A is an exploded diagram showing an electronic device according to a first embodiment of the invention. FIG. 2B is a schematic diagram showing the electronic device in FIG. 2A from another visual angle. FIG. 2C is a schematic diagram showing the assembled electronic device. In FIG. 2A~FIG. 2C, an electronic device 200 is a mobile phone, but the electronic device 200 is not limited to the mobile phone. The electronic device 200 includes a housing 210, a circuit board 220, a switch 230, and a side key 240.

The housing 210 includes a plurality of side walls 212. The circuit board 220 is disposed in the housing 210. The switch 230 is disposed on an inner surface 210a of the housing 210 which faces toward the circuit board 220, and it is electrically connected with the circuit board 220. The side key 240 disposes through a side wall 212 of the housing 210 and is located correspondingly to the switch 230. When the users press the side key 240, the side key 240 contacts the switch 230 and generates an electrical signal, and the electrical signal is transmitted to the circuit board 220 via the switch 230.

Detailedly speaking, the housing 210 of the electronic device 200 includes a first body 214 and a second body 216. A side wall of the first body 214 and a side wall of the second body 216 are assembled together to form the side wall 212 of the housing 210. The first body 214 is, for example, a front cover having a screen and an alphanumeric keyboard. The second body 216 may be a back cover used for fixing a battery. Additionally, the circuit board 220 has a front surface 222 and an opposite surface 224. The switch 230 is disposed on an inner surface 210a of the first body 214 which faces toward the front surface 222 the circuit board 220. Additionally, the circuit board 220 has a layout region 220a. A plurality of electronic components are located in the layout region 220a. Generally speaking, the electronic components are disposed on the circuit board 220 by utilizing the SMT. Consequently, the positioning holes (not shown) for inserting electronic components should be made in the positions of the circuit board 220 where the electronic components are to be disposed. The positioning holes are through the circuit board 220.

The first body 214 may have a plurality of limiting structures 214a protruding from the inner surface 210a. The limiting structure 214a may be ribs. The switch 230 is fastened with the limiting structures 214a and thus fixed on the inner surface 210a of the first body 214. The limiting structures 214a such as ribs provided on the inner surface 210a of the first body 214 is just taken as example. The shape of the limiting structures 214a is not limited. The way of disposing the switch 230 on the inner surface 210a of the first body 210 is also not limited. In other embodiments of the invention, the limiting structures 214a may be recesses, pillars or any other structures which can be think of. Additionally, the switch 230 can be adhered on the inner surface 210a of the first body 214 via an adhesion layer.

In FIG. 2A, the switch 230 includes a body 232, a first contact element 234, and a plurality of connecting elastic elements 236. The body 232 is made of insulated material such as plastic cement. The body 232 is disposed at the inner surface 210a of the first body 214. The first contact element 234 is made of conduct material such as metal. The first contact element 234 is located in the body 232. A part of the first contact element 234 is exposed from the body 232 to make the side key 240 contact the first contact element 234 and generate an electrical signal when the user presses the side key 240. The connecting elastic elements 236 are formed by bending metal. An end of every connecting elastic element 236 is electrically connected with the first contact element 234, and the other end contacts a pad 226 on the circuit board 220 to make the first contact element 234 electrically connected with the circuit board 220 via the connecting elastic element 236.

As stated above, the side key 240 includes a key body 242 and a second contact element 244. A part of the key body 242 is exposed from the housing 210. The second contact element 244 is located in the housing 210 and connected with the key body 242. The second contact element 244 is disposed correspondingly to the first contact element 234. The first contact element 234 has a first protrusion portion 234a. The second contact element 244 has a second protrusion portion 244a. When the user presses the key body 242 of the side key 240, the key body 242 pushes the second contact element 244 to make the second protrusion portion 244a contact the first protrusion portion 234a of the first contact element 234 and generate the electrical signal. In this embodiment, the first protrusion portion 234a may be a hemispherical protrusion usually called a metal dome. The second protrusion portion 244a may also be a protrusion dot, a pillar or a block. Since the first protrusion portion 234a is a hemispherical protrusion, when the first protrusion portion 234a is pressed by the second protrusion portion 244a and deformed, and the first contact element 234 returns to its original shape via the resilience, the first contact element 234 generates a click sound. Consequently, the user can determine that whether the side key 240 correctly contacts the switch 230 to generate the electrical signal or not according to the click sound, and the electrical signal is transmitted to the circuit board 220 via the switch 230 to perform functions.

Furthermore, the electronic device 200 further includes an electromagnetic shielding cover 250. A part of the layout region 220a is covered by the electromagnetic shielding cover 250 to prevent the electromagnetic wave in the external environment of the electronic device 200 affecting the operation of the electronic components in the electronic device 200. The switch 230 is disposed at the inner surface 210a of the housing corresponding to the layout region 220a uncovered by the electromagnetic shielding cover 250 (the slash marked region in FIG. 2B).

In the embodiment, the switch 230 is disposed at the inner surface 210a of the housing 210. The switch of the conventional electronic device is disposed on the circuit board by utilizing the SMT and occupies the space of the layout region of the circuit board 110 where the electronic components can be located. In contrast with the layout region of the circuit board of the conventional electronic device, the layout region 220a of the circuit board 220 in this embodiment is increased by the slash marked region in FIG. 2B. Thus, the space for disposing the electronic components is larger, and more electronic components can be provided. Furthermore, design requirements of being light, thin, short, small, and multifunctional for the electronic device may be met.

Additionally, the switch 230 is assembled on the inner surface 210a of the housing 210 by fastening, adhering, or any other ways which can be think of. In contrast with the conventional switch assembled by utilizing the SMT, the assembly process can be simplified, the assembly time is saved, the product yield rate is improved, and thus the cost is saved.

The second embodiment is similar to the first embodiment. The same or similar component numbers denote the same or similar components.

Figure 3:
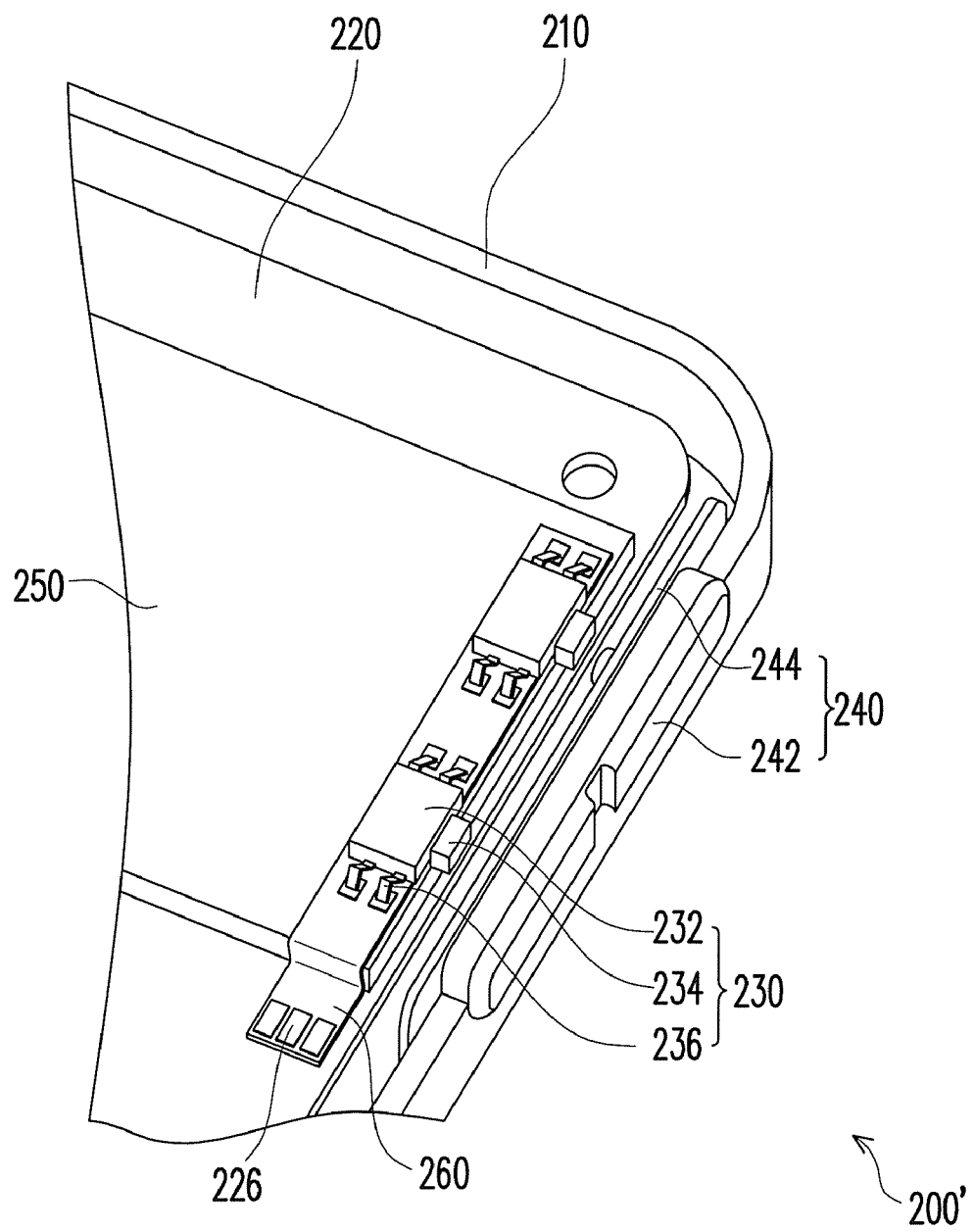
FIG. 3 is a schematic diagram showing an electronic device according to a second embodiment of the invention.

FIG. 3 is a schematic diagram showing an electronic device according to a second embodiment of the invention. The difference between this embodiment and the first embodiment is described as follows. In the electronic device 200' of this embodiment, the electromagnetic shielding cover 250 covers the entire layout region 220a (as shown in FIG. 2A). The electronic device 200' further includes a FPC 260. The FPC 260 is located on the electromagnetic shielding cover 250 and on the side of the circuit board corresponding to the switch 230. The switch 230 is electrically connected with the circuit board 220 via the FPC 260.

Detailedly speaking, the FPC 260 is located on the electromagnetic shielding cover 250. The switch 230 is above the FPC 260 correspondingly. Two ends of the FPC 260 are soldered on the circuit board 220. To avoid that the electrical connection between the FPC 260 and the electromagnetic shielding cover 250 causes a short circuit, an insulating layer (not shown) is provided on the surface of the FPC 260 which faces toward the electromagnetic shielding cover 250.

When the user presses the key body 242 of the side key 240, the key body 242 pushes the second contact element 244 to make the second protrusion portion (not shown in FIG.3) of the second contact element 244 contact the first contact element 234 and generate the electrical signal. The electrical signal is transmitted to the circuit board 220 via the FPC 260.

To sum up, in the electronic device of the invention, the switch corresponding to the side key is assembled on the inner surface of the housing which faces the circuit board via easy assemble ways such as fastening or adhering. As a result, the assembly process can be simplified, the assembly time is saved, the deviation in assembly can be avoided, and thus the product yield rate is improved.

Additionally, the switch is disposed at the inner surface of the housing, and therefore, the space for disposing the electronic components is increased, and more electronic components can be disposed. Consequently, the requirement of designing the electronic devices to be light, slim, short, small, and multifunctional can be met.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a housing including a plurality of side walls;
a circuit board disposed in the housing;
a switch disposed on an inner surface of the housing and electrically connected with the circuit board, wherein the inner surface faces toward the circuit board; and
a side key disposing through one of the side walls of the housing and located correspondingly to the switch, when the side key is pressed, the side key contacts the switch and generates an electrical signal, and the electrical signal is transmitted to the circuit board via the switch.

2. The electronic device according to the claim 1, wherein the housing comprises a first body and a second body, the first body and the second body are assembled together, and the switch is disposed at the inner surface of the first body which faces toward the circuit board.

3. The electronic device according to the claim 2, wherein the first body further comprises a plurality of limiting structures protruding from the inner surface, and the switch is fastened with the limiting structures.

4. The electronic device according to the claim 3, wherein the limiting structures are a plurality of ribs.

5. The electronic device according to the claim 1, further comprising an electromagnetic shielding cover, wherein the circuit board has a layout region, and at least a part of the layout region is covered by the electromagnetic shielding cover.

6. The electronic device according to the claim 5, wherein the switch is disposed on the position of the housing corresponding to the layout region uncovered by the electromagnetic shielding cover.

7. The electronic device according to the claim 5, further comprising a FPC, wherein the FPC is disposed on the electromagnetic shielding cover and below the switch correspondingly, and the FPC is electrically connected with the circuit board.

8. The electronic device according to the claim 1, wherein the switch comprises a body, a first contact element, and a plurality of connecting elastic elements, the body is disposed at the inner surface of the housing, the first contact element is disposed in the body, a part of the first contact element is exposed from the body, and the first contact element is electrically connected with the circuit board via the connecting elastic elements.

9. The electronic device according to the claim 8, wherein the side key comprises a key body and a second contact element, a part of the key body is exposed from the housing, the second contact element is located in the housing and connected with the key body, and the second contact element is disposed correspondingly to the first contact element.

10. The electronic device according to the claim 9, wherein the first contact element comprises a first protrusion portion, the second contact element comprises a second protrusion portion, when the key body is pressed, the key body pushes the second contact element to make the second protrusion portion contact the first protrusion portion of the first contact element.

11. The electronic device according to the claim 10, wherein at least one of the first protrusion portion and the second protrusion portion is a protrusion, the other is a protrusion, a pillar or a block.

* * * * *